July 4, 1933. C. L. SMITH 1,917,161

NONSKID TIRE CHAIN

Filed Nov. 13, 1931

Inventor
Charles Leonard Smith
By Frank Kufer
Attorney

Patented July 4, 1933

1,917,161

UNITED STATES PATENT OFFICE

CHARLES LEONARD SMITH, OF ROCHESTER, NEW YORK, ASSIGNOR OF ONE-HALF TO HARRY DUCKMAN, OF ROCHESTER, NEW YORK

NONSKID TIRE CHAIN

Application filed November 13, 1931. Serial No. 574,720.

The object of this invention is to provide a new and improved type of non-skid chain for automobile tires.

Another object of the invention is to provide the tire chain with rectangular shaped pads made up of rings of two sizes arranged in lines and rows, the small rings interlocking with the large rings.

Another object is to attach the pads at the corners to the side chains of the tires by links that extend out diagonally from the corners, the pads being held flat thereby on the tread of the tire.

These and other objects of this invention will be fully illustrated in the drawing, described in the specification, and pointed out in the claims at the end thereof.

In the drawing.

In the drawing like reference numerals indicate like parts.

Figure 1:
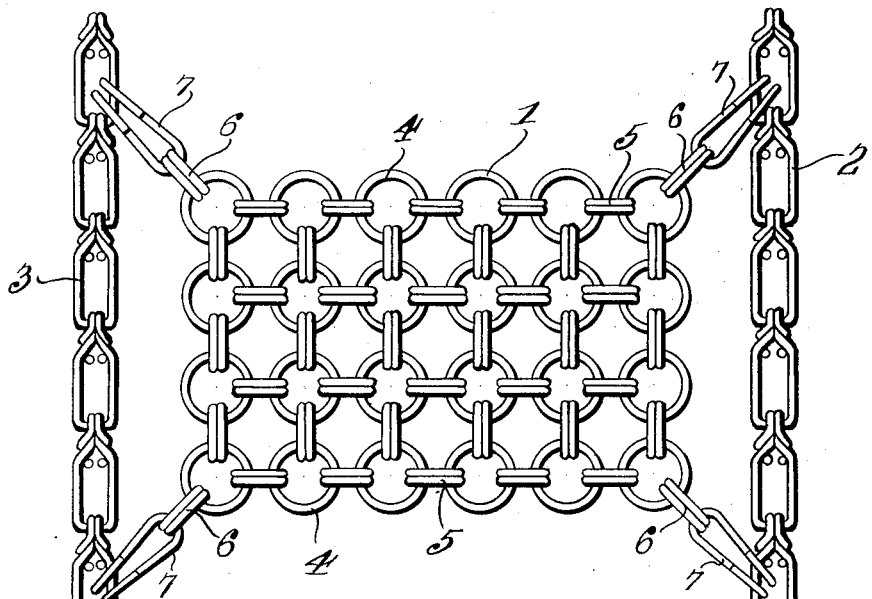
Figure 1 is a plan view of the chain.
Figures 2, 3:
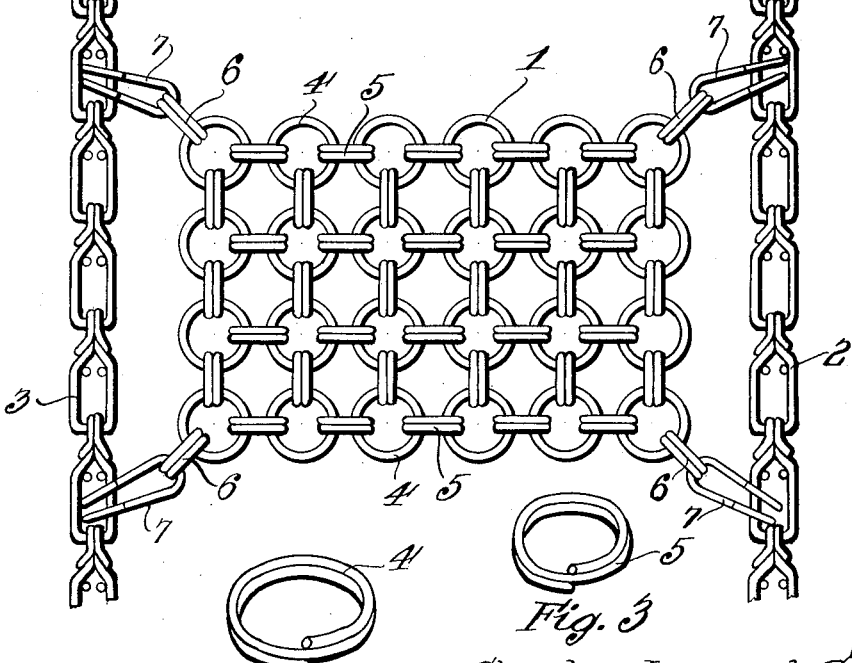
Figures 2 and 3 are detail views of the large and small rings used in my improved tire chain.

The non-skid chain for automobile tires forming the subject matter of this invention is an improvement on the non-skid tire chain shown in my prior Patent 1,610,333, and it comprises a series of wire pads which are adapted to lie flat upon the tread of the tire, and are attached to and stretch out between the side chains 2 and 3. Each of the wire pads are made up of a series of rings of two sizes, suitably interlocked together. The large rings are indicated by the reference numerals 4, and are preferably about seven-eighths of an inch inside diameter, and the small rings are indicated by the reference numerals 5 and are preferably about five-eighths of an inch inside diameter. These sizes may be varied from indefinitely. Each ring is made of two turns of wire.

As shown in Figure 1, each pad is composed of four parallel rows of large rings 4, there being six large rings in each row, or a total of 24 large rings altogether in each pad. These large rings are held together by small rings 5, of which there are four parallel rows of five rings each extending across the tread of the tire and six parallel lines of three rings each in each line extending circumferentially around the tire. There is thus in each rectangular pad 24 large rings and 38 small rings.

In each of the four corners of the pad is provided a small ring 6 with a hook 7 that is adapted to engage with the side chains 2 and 3, by which the pad is stretched out and held in open position flat on the tread of the tire. This is its normal position, and in this position the large rings lie substantially flat on the tread of the tire in contact or almost in contact therewith. The small rings stand practically upright thereon directly in contact with the tread of the tire. The 20 small rings standing in transverse rows and the 18 small rings standing in circumferential rows take hold directly on the surface of the road and prevent the tire from slipping or skidding thereon either forward or back or sideways in either direction. The pad is thus presented to the road with the maximum or best gripping effect thereon.

I claim:

1. A non-skid tire chain comprising a series of friction pads resting on the tread of the tire with open spaces between them, circular chains extending around the tire on each side thereof, said pads being connected to said chains by diagonal links, each of said pads being made up of parallel rows of rings lying flat on the tire, said rings being connected together loosely by rings standing upright on the tire and being arranged in rows transverse to the tread of the tire and in lines running parallel to the tread of the tire, four of the upright rings and four of the horizontal rings being arranged substantially in a square and enclosing an open space between them.

2. A non-skid tire chain comprising a series of friction pads resting on the tread of the tire with open spaces between them, circular chains extending around the tire on each side thereof, said pads being connected to said chains by diagonal links, each of said pads being made up of parallel rows of circular rings disposed flatwise to the tire, said rings being connected together loosely by circular rings disposed in angular relation to said first named rings, and being arranged in rows transverse to the tread of the tire and in lines running parallel to the tread of the tire, four of the upright rings and four of the horizontal rings being arranged substantially in a square and inclosing an open space between them.

In testimony whereof I affix my signature.

CHARLES LEONARD SMITH.